United States Patent [19]

Toboshi et al.

[11] 4,261,239

[45] Apr. 14, 1981

[54] POSITIONING HEAD FOR CUTTING AND MARKING APPARATUS

[75] Inventors: Katsumasa Toboshi; Minoru Saito, both of Hatano, Japan

[73] Assignee: Nihon Electronic Industry Co., Ltd., Odawara, Japan

[21] Appl. No.: 101,554

[22] Filed: Dec. 7, 1979

[30] Foreign Application Priority Data

Dec. 13, 1978 [JP] Japan ............................... 53/153168

[51] Int. Cl.³ ............................................ B23D 19/06

[52] U.S. Cl. ........................................ 83/499; 83/504; 83/508.3; 83/560; 493/355; 493/370

[58] Field of Search ...................... 83/499, 504, 508.3, 83/425.4, 560; 93/58 R, 58.2 R

[56] References Cited

U.S. PATENT DOCUMENTS

| | | | |
|---|---|---|---|
| 4,077,291 | 3/1978 | Obenshain | 83/499 |
| 4,132,157 | 1/1979 | Shinomiya | 93/58.2 R X |
| 4,142,455 | 3/1979 | Coburn | 83/499 X |
| 4,211,135 | 7/1980 | Wehde | 83/499 |

*Primary Examiner*—Donald R. Schran
*Attorney, Agent, or Firm*—Fleit & Jacobson

[57] ABSTRACT

There is disclosed a positioning head for cutting and marking apparatus, whereby when a plurality of cutter wheels or marking-off wheels are successively moved into place, the positioning head or heads which have already been positioned in place can be locked in place. The positioning head comprises, within a housing mounted on the boss of the cutter or marking-off wheel and slidably fitted on two guide bars, a feed gear threadedly engaged with a feed screw shaft which is extended through the housing, an input gear slidably mounted on an input shaft which is extended through the housing, a group of driving gears for transmitting the rotation of the input gear to the feed gear, and a clutch for connecting and disconnecting the driving force transmitted to the feed gear from the input gear, whereby after the positioning head has been put in place, the clutch may be disengaged so as to lock the positioning head in place while any other positioning head is being moved.

5 Claims, 7 Drawing Figures

POSITIONING HEAD FOR CUTTING AND MARKING APPARATUS

BACKGROUND OF THE INVENTION

The present invention relates to positioning heads for cutting and marking apparatus, and more particularly the invention relates to a positioning head which is designed so that after the positioning head has been put in place, the positioning head can be locked in place even any other positioning head is being moved for positioning purposes.

Cutting and marking apparatus are known in the art by which creases and cuts are made continuously in a long sheet material, such as, a corrugated board sheet or synthetic resin sheet in the lengthwise direction thereof and this type of known cutting and marking apparatus is so designed that each of the cutter and marking-off wheels is moved into place by a robot arm and then the cutter wheel or the marking-off wheel is locked in place by forcing a liquid such as machine oil into a hollow shaft holding the cutter or marking-off wheel so as to expand and cause the shaft to lock the wheel in place.

However, this type of known apparatus is disadvantageous in that unless the hollow shafts are machined to obtain the desired wall thickness with a high degree of accuracy, the hollow shaft will be expanded non-uniformly and it will thus be difficult to positively lock all the cutter wheels or the marking-off wheels in place.

For this reason, an apparatus has been developed in which each of the cutter wheels as well as the marking-off wheels is engaged with a key so as to fasten the cutter wheel or the marking-off wheel to a shaft, and this apparatus has disadvantages in that the apparatus is complicate in construction and high in cost.

Another type of apparatus is known in the art in which the bosses of all cutter or marking-off wheels are mounted threadedly on a feed screw shaft and the feed screw shaft is rotated to move the cutter wheels or the marking-off wheels into place. A disadvantage of this apparatus is that the rotation of the feed screw shaft results in the simultaneous movement of the adjacent cutter wheels and it is impossible to separately position the cutter wheels. Another disadvantage is that if it is desired to separately position the cutter wheels, it will be necessary to provide for example a feed screw shaft for each of the cutter wheels, making the apparatus complicate and large in construction.

SUMMARY OF THE INVENTION

With a view to overcoming the foregoing deficiencies in the prior art, it is an object of the invention to provide a positioning head for cutting and marking apparatus comprising a housing mounted on the boss of a cutter wheel or marking-off wheel and slidably fitted on two guide bars, and within the housing, a feed gear threadedly mounted on a feed screw shaft which is extended through the housing, an input gear slidably mounted on an input shaft which is extended through the housing, a group of driving gears for transmitting the rotation of the input gear to the feed gear, and a clutch for connecting and disconnecting the driving force transmitted from the input gear to the feed gear.

It is another object of the invention to provide such positioning head comprising brake means for braking the rotation of the feed gear.

It is still another object of the invention to provide such positioning head wherein the housing is adapted for rotation about the guide bars.

It is still another object of the invention to provide such positioning head wherein the driving gear group is designed so that the input gear is rotated in the same direction as the feed gear.

It is still another object of the invention to provide such positioning head wherein the driving gear group is so designed that the input gear and the feed gear are rotated in different directions.

Other and further objects, features and advantages of the present invention will appear more fully from the following description.

DESCRIPTION OF THE PREFERRED EMBODIMENTS

Figure 1:
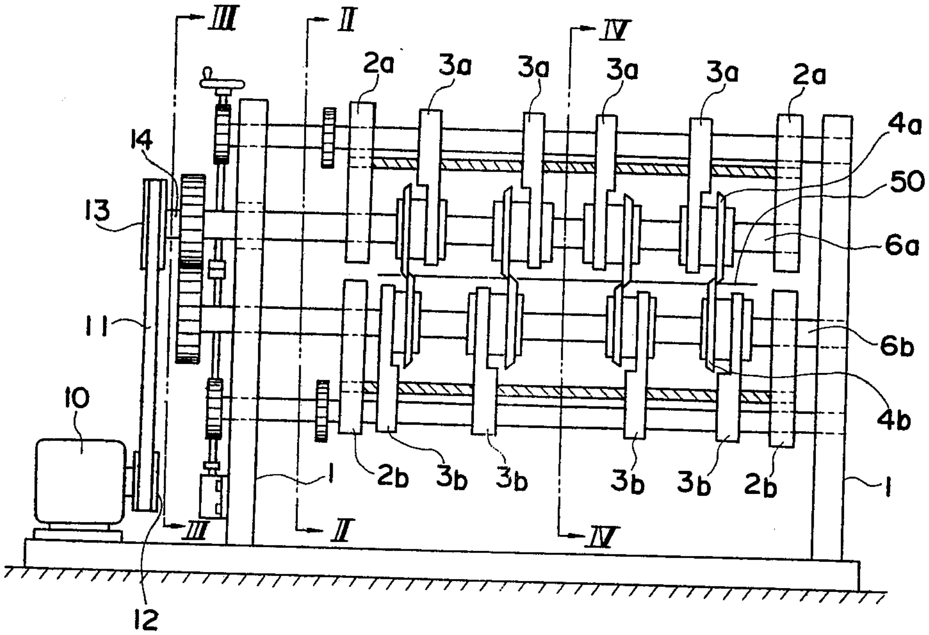
FIG. 1 is a front view of cutting and marking apparatus equipped with a plurality of positioning heads provided according to the teaching of the present invention.
Figure 2:
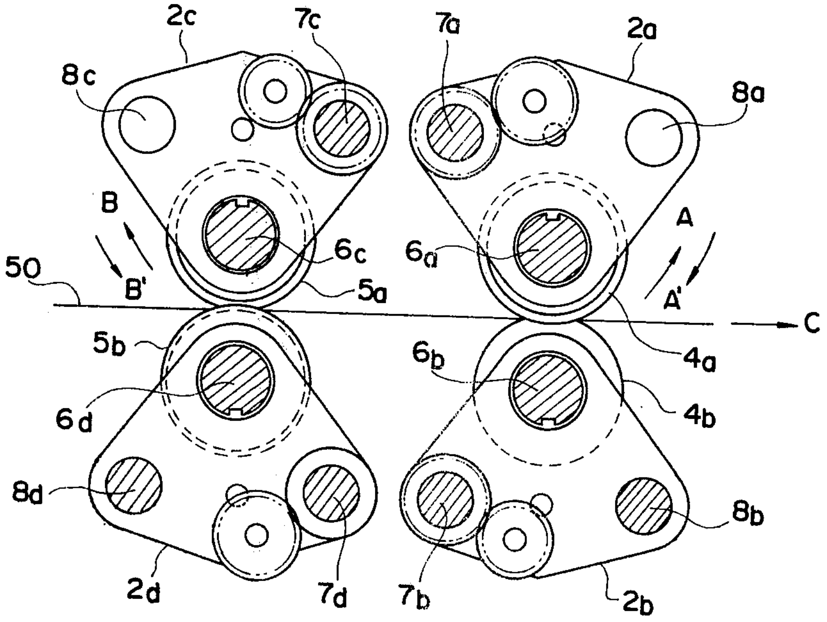
FIG. 2 is a sectional view taken along the line II—II of FIG. 1.
Figure 3:
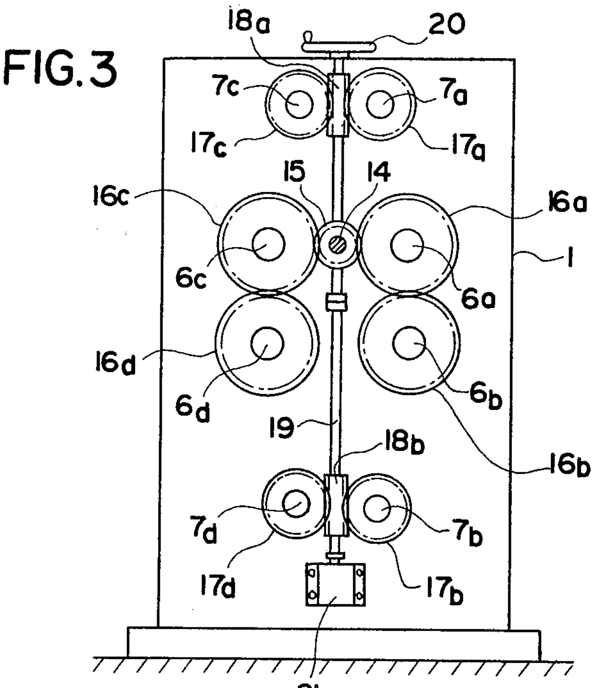
FIG. 3 is a sectional view taken along the line III—III of FIG. 1.

Referring now to FIGS. 1, 2, 3 and 4, numeral 1 designates a frame, and 2*a* supporting arms mounted on guide bars 7*a* and 8*a* which are extended parallel to each other. Numeral 3*a* designates a desired number of positioning heads which are slidably mounted on the guide bars 7*a* and 8*a*. The guide bar 7*a* is rotatably mounted in the frame 1. The guide bar 8*a* is fixedly secured to the supporting arms 2*a*. Numeral 4 designates cutter wheels each of which is rotatably mounted on one of the positioning heads 3 by way of a boss 9*a*. Numeral 6*a* designates a drive shaft for the cutter wheels 4*a* and the drive shaft 6*a* is rotatably mounted in the supporting arms 2*a*. The positioning heads 3*a* are rotatable along with the supporting arms 2*a* about the guide bar 7*a* and during the suspension of operation as well as the periods of positioning operation the positioning heads 3*a* are each rotated in the direction of an arrow A to bring the cutter wheel 4*a* into its raised position.

Similarly, numeral 2*b* designates supporting arms mounted on guide bars 7*b* and 8*b* which are extended parallel to each other. Numeral 3*b* designates positioning heads each of which forms a pair with one of the positioning heads 3*a*, and a desired number of the positioning heads 3*b* are slidably mounted on the guide bars 7*b* and 8*b*. The guide bars 7*b* and 8*b* are extended through the supporting arms 2*b* and are mounted rotatably in the frame 1. Numeral 4*b* designates cutter wheels each of which forms a pair with one of the cutter wheels 4*a*, and each cutter wheel 4*b* is rotatably mounted on one of the positioning heads 3*b* by way of a boss 9*b*. Numeral 6*b* designates a drive shaft for the cutter wheels 4*b*, which is extended through the supporting arms 2*b* and is rotatably mounted in the frame 1.

The rotation of the positioning heads 3*a* which are arranged above may be effected by means of for example two hydraulic cylinders (not shown) each having its one end fastened to the supporting arm 2*a* near the guide bar 8*a* and the other end fastened to the supporting arm 2*b* near the guide bar 8*b*.

The marking apparatus is constructed in the like manner as the above-described cutting apparatus.

More specifically, numeral 2*c* designates supporting arms mounted on guide bars 7*c* and 8*c* which are extended parallel to each other. Numeral 3*c* designates a desired number of positioning heads which are slidably mounted on the guide bars 7*c* and 8*c*. The guide bar 7*c* is rotatably mounted in the frame 1. The guide bar 8*c* is fixedly secured to the supporting arms 2*c*. Numeral 5*a* designates marking-off wheels each of which is rotatably mounted on one of the positioning heads 3*c* by way of a boss 9*c*. Numeral 6*c* designates a drive shaft for the marking-off wheels 5*a* and the drive shaft 6*c* is rotatably mounted in the supporting arms 2*c*. The positioning heads 3*c* are rotatable along with the supporting arms 2*c* about the guide bar 7*c*, and during the suspension of operation as well as the periods of positioning operation the positioning heads 3*c* are each rotated in the direction of an arrow B to bring the marking-off wheel 5*a* into its raised position.

On the other hand, numeral 2*d* designates supporting arms which are positioned below the supporting arms 2*c* and the supporting arms 2*d* are mounted on guide bars 7*d* and 8*d* which are extended parallel to each other. Numeral 3*d* designates positioning heads each of which forms a pair with one of the positioning heads 3*c* and a desired number of the positioning heads 3*d* are slidably mounted on the guide bars 7*d* and 8*d*. The guide bars 7*d* and 8*d* are extended through the supporting arms 2*d* and are rotatably mounted in the frame 1. Numeral 5*b* designates marking-off wheels each of which forms a pair with one of the marking-off wheels 5*a* and the marking-off wheel 5*b* is rotatably mounted on one of the positioning heads 3*d* by way of a boss 9*d*. Numeral 6*d* designates a drive shaft for the marking-off wheels 5*b*, which is extended through the supporting arms 2*d* and mounted rotatably in the frame 1.

The rotation of the positioning heads 3*c* which are arranged above may be effected by means of for example two hydraulic cylinders (not shown) each having its one end fastened to the supporting arm 2*c* near the guide bar 8*c* and the other end fastened to the supporting arm 2*d* near the guide bar 8*d*.

Numeral 10 designates a drive motor, 11*a* V-belt extended over pulleys 12 and 13, and 15 a gear mounted on a shaft 14 of the pulley 13 and the gear 15 is in mesh with a gear 16*a* mounted on the drive shaft 6*a* and a gear 16*c* mounted on the drive shaft 6*c*. The gear 16*a* is in mesh with a gear 16*b* mounted on the drive shaft 6*b* and the gear 16*c* is in meash with a gear 16*d* mounted on the drive shaft 6*d*.

Numerals 18*a* and 18*b* designate worms mounted on a shaft 19 having a handle 20 at the upper end thereof and the lower end thereof supported by a bearing 21, and the worm 18*a* is in mesh with a worm wheel 17*a* mounted on the guide bar 7*a* and a worm wheel 17*c* mounted on the guide bar 7*c*. The other worm 18*b* is in mesh with a worm wheel 17*b* mounted on the guide bar 7*b* and a worm wheel 17*d* mounted on the guide bar 7*d*.

The positioning heads 3*a*, 3*b*, 3*c* and 3*d* are the same in construction. Thus, the positioning head 3*a* mounted on the cutter wheel 4*a* will now be described by way of example.

Figure 5:
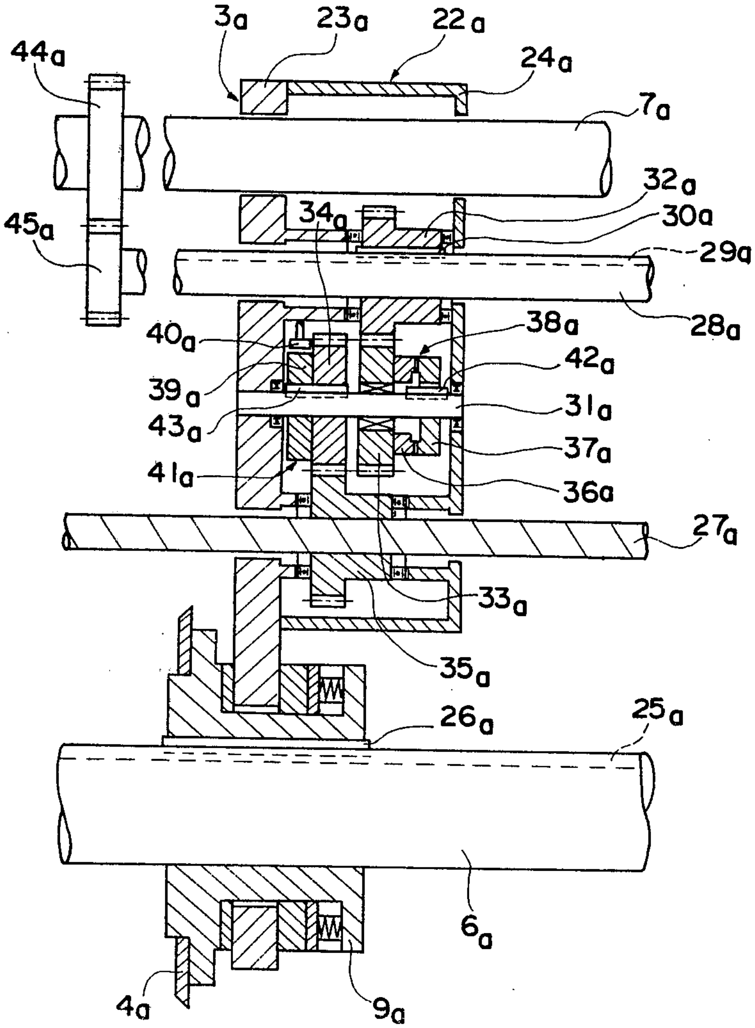
FIG. 5 is a schematic sectional view showing an embodiment of the positioning head according to the invention.

Referring to FIG. 5, numeral 22*a* designates the housing of the positioning head 3*a* comprising a plate support 23*a* and a box cover 24*a*, and the cutter wheel 4*a* is rotatably mounted on the plate support 23*a* by way of the boss 9*a*. The boss 9*a* is slidably mounted on the drive shaft 6*a* formed with a key way 25*a*. Numeral 26*a* designates a key fixed to the boss 9*a* and the rotation of the drive shaft 6*a* is transmitted to the boss 9*a* by way of the key 26*a*.

Numeral 27*a* designates a feed screw shaft arranged to extend through the housing 22*a*, and the ends of the feed screw shaft 27*a* are secured to the supporting arms 2*a*. The feed screw shaft 27*a* is formed with feed threads of the same direction over the entire length thereof. Numeral 28*a* designates an input shaft arranged to extend through the housing 22*a* and the input shaft 28*a* is rotatably mounted in the supporting arms 2*a*. Numeral 45*a* designates a gear mounted on the input shaft 28*a*, and 44*a* a gear mounted on the guide bar 7*a*. The rotation of the guide bar 7*a* is transmitted to the input shaft 28*a* by way of the gears 44*a* and 45*a*. Numeral 29*a* designates a key way formed in the input shaft 28*a*. Disposed within the housing 22*a* are an input gear, an idler gear, a feed gear, a clutch and a brake which will be described later.

More specifically, numeral 32*a* designates an input gear slidably mounted on the input shaft 28*a* and the rotation of the input shaft 28*a* is transmitted to the input gear 32*a* by way of a key 30*a* secured to the input gear 32*a*. Numeral 33*a* designates an idler gear engaged with the input gear 32*a* and the idler gear 33*a* is rotatably mounted on a shaft 31*a* which is rotatably mounted in the housing 22*a*. Numeral 36*a* designates a clutch disk fixed to the idler gear so as to be concentric therewith, and 37*a* a clutch disk slidably mounted on the shaft 31*a* by way of a slide key 42*a*. The clutch disks 36*a* and 37*a* form a clutch 38*a*. Numeral 34*a* designates an intermediate gear fixedly mounted on the shaft 31*a* means of a key 43*a*, 39*a* a brake disk fixedly mounted on the shaft 31*a* by means of the key 43*a*, and 40*a* a brake shoe arranged to face the brake disk 39*a*. The brake shoe 40*a* and the brake disk 39*a* form a brake 41*a*. Numeral 35*a* designates a feed gear threadedly mounted on the feed screw shaft 27*a* and the feed gear 35*a* is in meash with the intermediate gear 34*a*.

Figure 4:
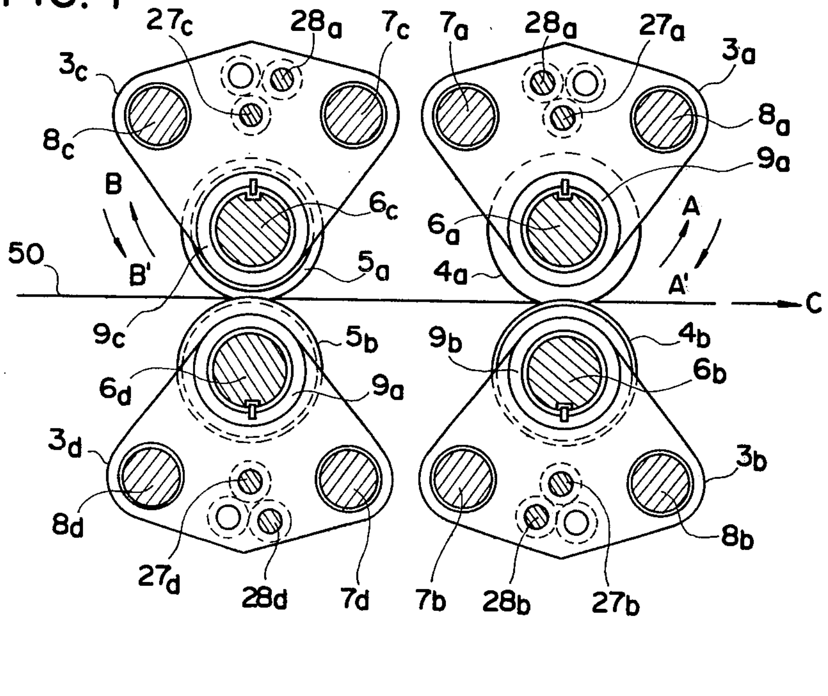
FIG. 4 is a sectional view taken along the line IV—IV of FIG. 1.

Referring to FIG. 4, numerals 27*b*, 27*c* and 27*d* designate feed screw shafts, and 28*b*, 28*c* and 28*d* input shafts.

Figure 6:
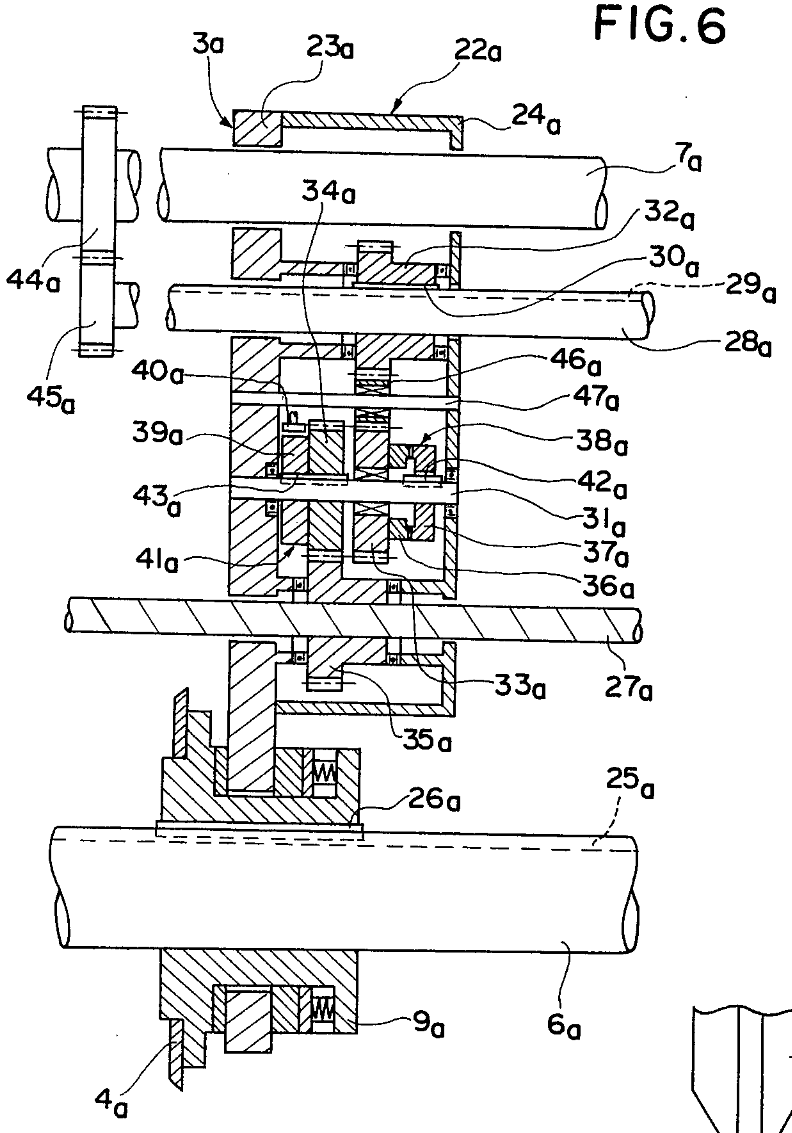
FIG. 6 is a schematic sectional view showing another embodiment of the positioning head according to the invention.

FIG. 6 shows another embodiment of the positioning head which differs from the first embodiment in that an idler gear 46*a* is disposed between the input gear 32*a* and the idler gear 33*a*. The idler gear 46*a* is rotatably mounted on a shaft 47*a* mounted in the housing 22*a*. Due to the provision of the idler gear 46*a*, even if the input gear 32*a* is rotated in the same direction as in the embodiment of FIG. 5, the feed gear 35*a* is rotated in the opposite direction and the positioning heads are fed in the opposite direction to that of the embodiment of FIG. 5.

As a result, if, for example, the left half of the positioning heads in FIG. 1 comprises the heads of the type shown in FIG. 5 and the right half of the positioning heads comprises the heads of the type shown in FIG. 6, the respective positioning heads may be conveniently brought to the sides of the cutting and marking apparatus for the purpose of repairs or the like. Numeral 50 designates a sheet of corrugated board.

The positioning of the positioning heads will now be described.

In order to put the positioning heads 3*a* in place, the supporting arms 2*a* are first rotated about the guide bar 7*a* in the direction of the arrow A. The rotation of the supporting arms 2*a* causes the positioning heads 3*a* to rotate in the like manner and consequently the cutter wheels 4*a* are raised. When the cutter wheels 4*a* are raised so that horizontal movement of the positioning heads 3*a* will not cause them to strike against the lower cutter wheels 4*b*, the rotary movement of the supporting arms 2*a* is stopped so as to maintain the thus attained condition. For this purpose, the hydraulic cylinders (not shown) are used.

Then, the handle 20 is moved manually so that the rotation of the worm 18*a* is transmitted to the worm wheel 17*a* and the guide bar 7*a* is rotated. The rotation of the guide bar 7*a* is transmitted to the input shaft 28*a* by way of the gears 44*a* and 45*a*. The rotation of the input gear 28*a* is transmitted to each input gear 32*a* by way of the key 30*a* and the rotation of the input gear 32*a* is transmitted to the idler gear 33*a*.

In this condition, the clutch disks 36*a* and 37*a* are engaged with the result that the rotation of the idler gear 33*a* is transmitted to the shaft 31*a* by way of the key 42*a* and the intermediate gear 34*a* and the brake disk 39*a* are rotated along with the shaft 31*a*, thus transmitting the rotation of the intermediate gear 34*a* to the feed gear 35*a*. When the feed gear 35*a* is rotated, the feed gear 35*a* is moved along the feed screw shaft 27*a* with which the former is threadedly engaged and the movement of the feed gear 35*a* causes the housing 22*a* to move along the guide bars 7*a* and 8*a*. When the movement of the housing 22*a* brings the cutter wheel 4*a* into a desired position, the clutch disks 36*a* and 37*a* are disengaged with the result that the rotation of the shaft 31*a* is stopped and the rotation of the input shaft 28*a* is no longer transmitted to the feed gear 35*a*, thus locking the cutter wheel 4*a* in the desired position. After the positioning head 3*a* has been locked in place, the brake is applied by pressing the brake shoe 40*a* against the brake disk 39*a*. The operation of the clutch as well as the operation of the brake can be accomplished mechanically or electrically by any known methods.

Then, the following positioning heads 3*a* are sucessively put in place in the same manner as mentioned previously. After all the positioning heads 3*a* have been put in place in this way, the positioning heads 3*b* disposed below the positioning heads 3*a* are all put in place in the same manner as mentioned previously.

After all the upper and lower positioning heads 3*a* and 3*b* have been put in place in the above-mentioned manner, the supporting arms 2*a* are each rotated in the direction of an arrow A' back into the initial position by means of the hydraulic cylinder. The required adjustment of the engagement between the cutter wheels 4*a* and 4*b* is accomplished by fine adjustment in the same manner as the feeding of the positioning heads 3*a* and 3*b*.

Figure 7:
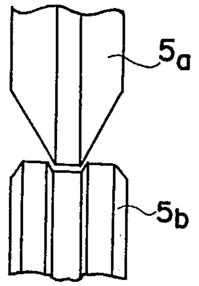
FIG. 7 is a front view showing the manner in which the upper and lower marking-off wheels are engaged with each other.

The positioning of the marking-off wheels 5*a* and 5*b* is accomplished in the same manner as the positioning of the cutter wheels 5*a* and 5*b*. The marking-off wheels 5*a* and 5*b* are engaged as shown in FIG. 7.

After all the cutter wheels and the marking-off wheels have been positioned in place in the above-mentioned manner, the motor 10 is operated so that the rotation of the motor 10 is transmitted through the pulley 12 and the V-belt 11 to the pulley 13 which is mounted on the same shaft as the gear 15. The rotation of the gear 15 rotating together with the pulley 13 is transmitted to the gears 16*a*, 16*b*, 16*c* and 16*d* which are respectively mounted on the drive shafts 6*a*, 6*b*, 6*c* and 6*d* and the drive shafts 6*a*, 6*b*, 6*c* and 6*d* are simultaneously started to rotate. The rotation of the drive shafts 6*a*, 6*b*, 6*c* and 6*d* simultaneously brings the cutter wheels 4*a* and 4*b* and the marking-off wheels 5*a* and 5*b* into rotation.

As a result, when a long sheet of corrugated board 50 is fed in the direction of an arrow C, the marking-off wheels 5*a* and 5*b* produce continuous creases in the corrugated board sheet 50 in the lengthwise direction thereof and the sheet 50 is continuously cut in the lengthwise direction by the cutter wheels 4*a* and 4*b*.

It will thus be seen from the foregoing description that the positioning head according to the invention, though simple in construction, is advantageous in that once the positioning head has been put in place, the head can be firmly held in place even during the positioning operation of other positioning heads.

What is claimed is:

1. A positioning head for cutting and marking apparatus comprising:

- a housing mounted on a boss of a cutter wheel or marking-off wheel and slidably fitted on two guide bars;
- a feed gear threadedly mounted on a feed screw shaft extended through said housing;
- an input gear slidably mounted on an input shaft extended through said housing;
- a drive gear group for transmitting the rotation of said input gear means to said feed gear; and
- a clutch for connecting and disconnecting the driving force transmitted from said input gear to said feed gear.

2. A positioning head according to claim 1, further comprising brake means for braking the rotation of said feed gear.

3. A positioning head according to claim 1, wherein said housing is rotatable about one of said guide bars as the axis thereof.

4. A positioning head according to claim 1, wherein said driving gear group is adapted so that said input gear and said feed gear are rotated in the same direction.

5. A positioning head according to claim 1, wherein said driving gear group is adapted so that said input gear and said feed gear are rotated in different directions.

* * * * *